(12) United States Patent
Richardson et al.

(10) Patent No.: US 7,207,418 B2
(45) Date of Patent: Apr. 24, 2007

(54) OIL FILL MACHINE

(75) Inventors: Kenneth B. Richardson, Highland, MI (US); David W. Mitchell, Livonia, MI (US)

(73) Assignee: Cinetic Automation Corporation, Farmington Hills, MI (US)

( * ) Notice: Subject to any disclaimer, the term of this patent is extended or adjusted under 35 U.S.C. 154(b) by 627 days.

(21) Appl. No.: 10/694,633

(22) Filed: Oct. 27, 2003

(65) Prior Publication Data

US 2005/0087253 A1   Apr. 28, 2005

(51) Int. Cl.
*F16C 3/14* (2006.01)
(52) U.S. Cl. .......................................... 184/1.5; 141/98
(58) Field of Classification Search ................. 184/1.5, 184/106; 141/98, 114
See application file for complete search history.

(56) References Cited

U.S. PATENT DOCUMENTS

| 5,226,311 A | 7/1993 | Scourtes |
| 5,318,080 A * | 6/1994 | Viken ............................ 141/98 |
| RE34,715 E | 9/1994 | Gudenau et al. |
| 5,427,202 A * | 6/1995 | Behring et al. ............... 184/1.5 |
| 5,472,064 A * | 12/1995 | Viken ........................... 184/1.5 |
| 5,553,490 A | 9/1996 | Nicholls et al. |
| 6,029,720 A | 2/2000 | Swinford |
| 6,378,657 B2 * | 4/2002 | Viken ........................... 184/1.5 |
| 6,752,181 B1 * | 6/2004 | Awad ............................ 141/98 |
| 6,779,633 B2 * | 8/2004 | Viken ........................... 184/1.5 |
| 7,082,814 B2 * | 8/2006 | Gorski et al. ............... 73/118.1 |

FOREIGN PATENT DOCUMENTS

| DE | 101 49 134 A1 | 4/2003 |
| EP | 0 707 143 B1 | 3/1999 |
| JP | 07 149397 | 6/1995 |

* cited by examiner

*Primary Examiner*—David M. Fenstermacher
(74) *Attorney, Agent, or Firm*—Harness, Dickey & Pierce, P.L.C.

(57) ABSTRACT

A method and apparatus for filling a transmission at the transmission assembly plant including the steps of pumping fluid through the transmission entering at a first port and exiting through a second port, rotating the torque converter to purge trapped air, shifting the transmission, filling the transmission to a desired level and plugging the first and second ports. Through use of the method and apparatus of the present invention, the transmission is placed in a "road ready" condition and will not require additional fluid to be added in a top off operation at the vehicle assembly plant.

28 Claims, 8 Drawing Sheets

OIL FILL MACHINE

BACKGROUND AND SUMMARY OF THE INVENTION

The present invention relates to a method and apparatus to fill an automatic transmission with fluid. More particularly, the present invention relates to a fluid filling process occurring while the torque converter of the transmission is being rotated.

Automatic transmissions for vehicles typically require a predetermined quantity of fluid to ensure proper operation. Various fluid filling devices and methods have been devised to fill transmissions with fluid. One method involves pumping a known-quantity of fluid into the recently assembled transmission. This method suffers from inaccuracy possibly resulting in an over-filled or under-filled transmission. Because some of the components within the transmission have already been "wetted" during previous testing, an unknown quantity of fluid is already present in the transmission.

Another method includes weighing each component of the automatic transmission in a dry state and weighing an assembled automatic transmission which has been properly filled. The difference between the weights correlates to the quantity of fluid to be added. Unfortunately, this method may also be subject to undesirable over-filling or under-filling of the transmission based on component weight variation and model mix complexity.

Yet another method involves filling the transmission to a predetermined level. However, at the time of first filling an automatic transmission, unknown quantities of air are trapped within the torque converter and other cavities of the automatic transmission. Therefore, the transmission may be over-filled or under-filled depending on the quantity of trapped air. Based on the variations previously described, it is common practice for the transmission assembly plant to provide the transmission in an under-filled condition to the vehicle assembly plant. At the vehicle assembly plant, the transmission is coupled to a transmission cooler and the vehicle's engine. Once these connections have been made, a final fill or "top off" operation is performed to assure that the automatic transmission has been filled to the proper level. At the vehicle assembly plant, the top off operation is costly and time consuming.

Accordingly, the present invention provides a method and apparatus for properly filling a transmission at the transmission assembly plant. In particular, a method of filling a transmission with fluid is provided including the steps of pumping fluid through the transmission entering at the first port and exiting through the second port, rotating the torque converter to purge trapped air, shifting the transmission, filling the transmission to a desired level and plugging the first and second ports. Through use of the method and apparatus of the present invention, the transmission is placed in a "road ready" condition and will not require additional fluid to be added in a top off operation at the vehicle assembly plant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
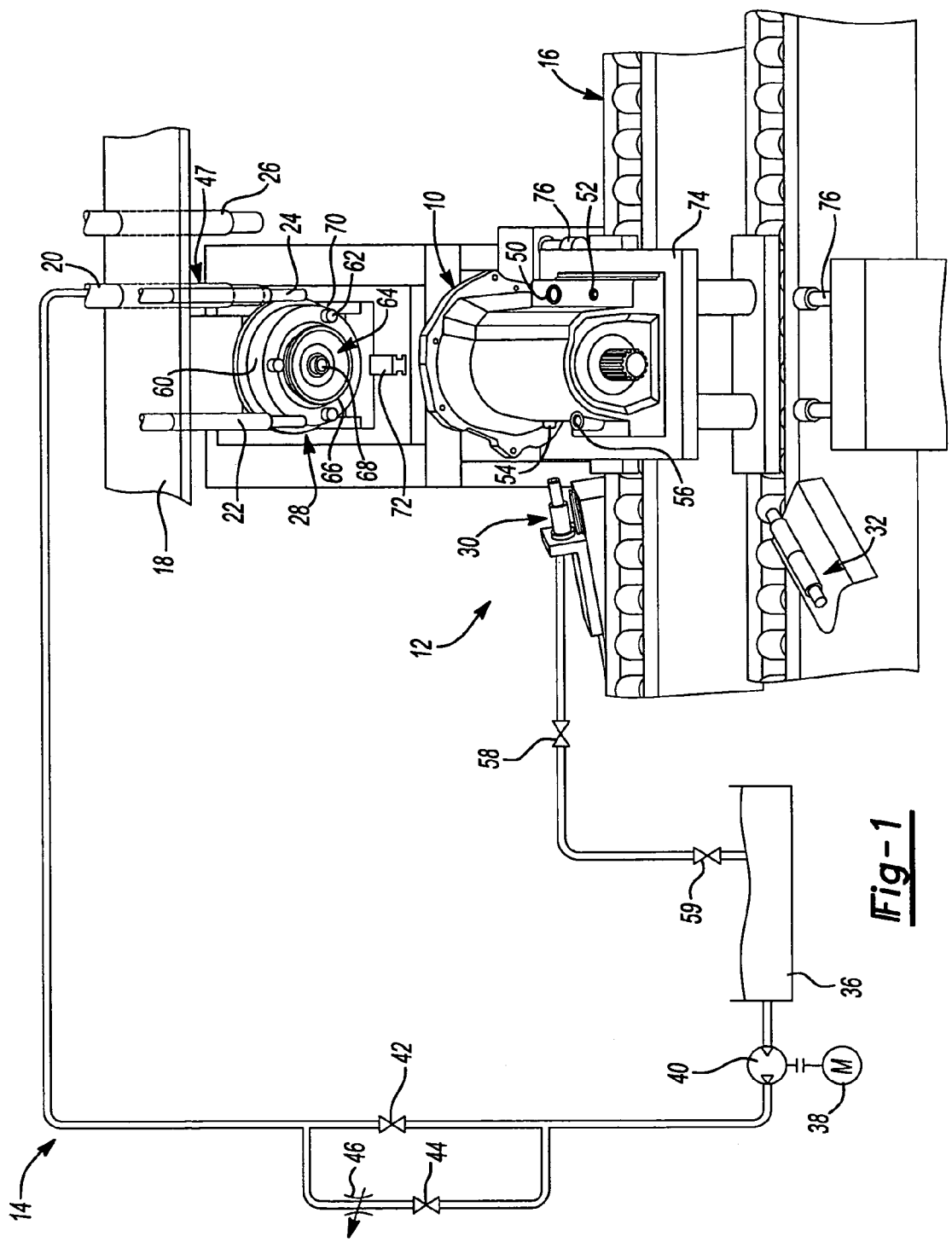
FIG. 1 is a schematic view of an exemplary work station including the oil fill machine of the present invention.
Figure 2:
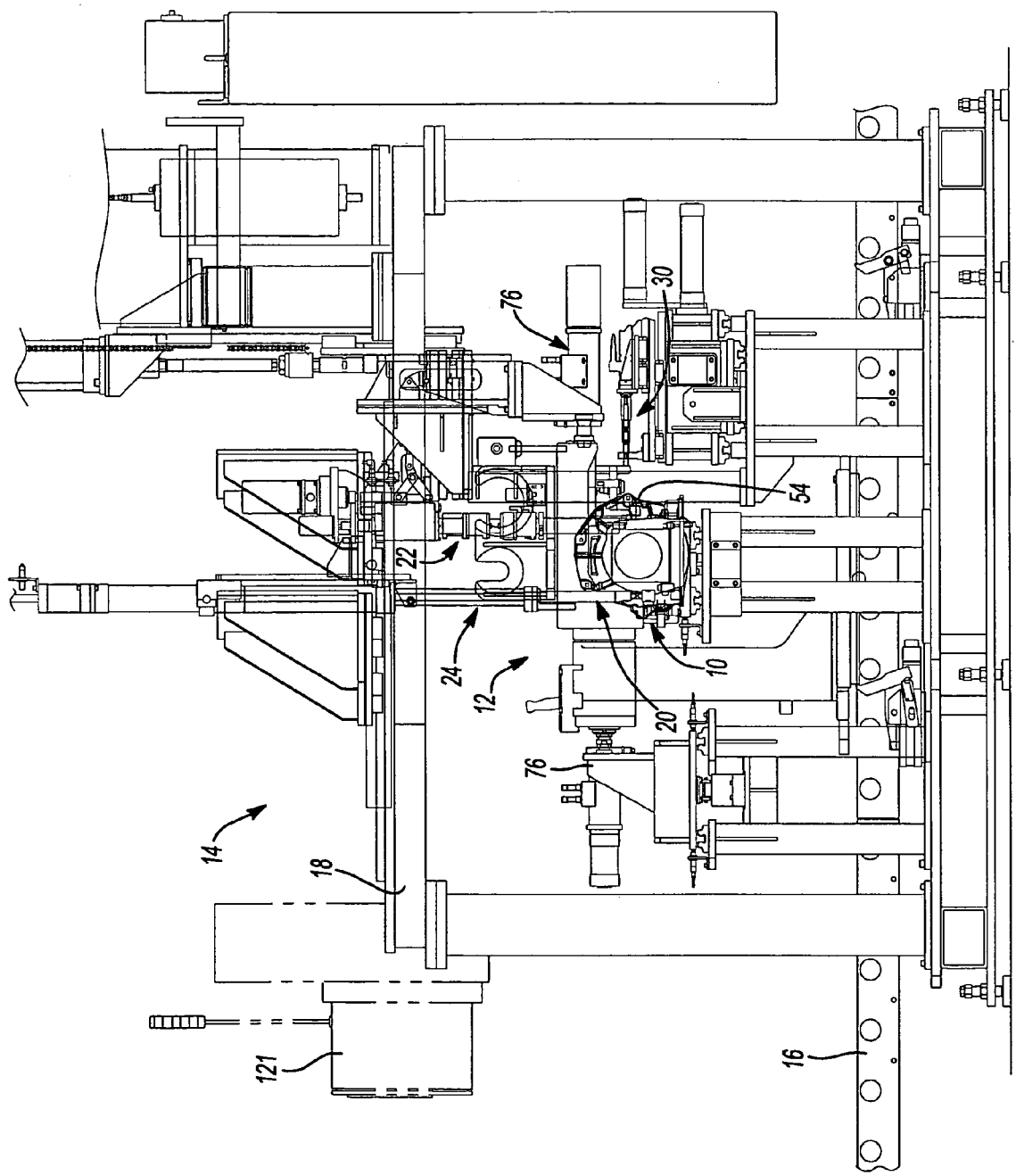
FIG. 2 is a side view of the work station including an exemplary transmission.

With reference to FIGS. 1 and 2, an exemplary automatic transmission 10 is positioned within an oil fill machine 12 constructed in accordance with the teachings of the present invention. Oil fill machine 12 is depicted as a work station 14 positioned along a conveyor 16 of an automatic transmission assembly line. Oil fill machine 12 is configured to allow transmissions to sequentially enter work station 14, be filled with fluid and exit the work station once the fill process of the present invention has been completed.

Work station 14 includes a gantry frame 18 supporting overhead tooling including a fill nozzle 20, a shifter collet 22, a temperature compensation tool 24 and a dipstick plug tool 26. A drive unit 28, a return nozzle 30, and a cooler fitting tool 32 are also positioned within work station 14 and may be coupled to gantry frame 18.

As mentioned earlier, oil fill machine 12 functions to accurately fill automatic transmission 10 with fluid such that a subsequent top off filling operation is not required at the vehicle assembly plant. To achieve this goal, drive unit 28 rotates a torque converter 34 of transmission 10 while fluid is pumped through the automatic transmission. Specifically, fluid is stored in a tank 36 having a motor 38 and a pump 40 coupled thereto. Fluid may be selectively dispensed through fill nozzle 20 by opening a combination of three inlet valves. A fast fill valve 42 provides substantially unrestricted flow from pump 40 to nozzle 20. A slow fill valve 44 is plumbed in series with an orifice 46. Orifice 46 reduces the flow through fill nozzle 20 and allows for more accurate control of the final fill level as will be described in greater detail hereinafter. A nozzle valve 47 is located within fill nozzle 20. Nozzle valve 47 receives fluid allowed to pass by fast fill valve 42 and/or slow fill valve 44.

Figure 3:
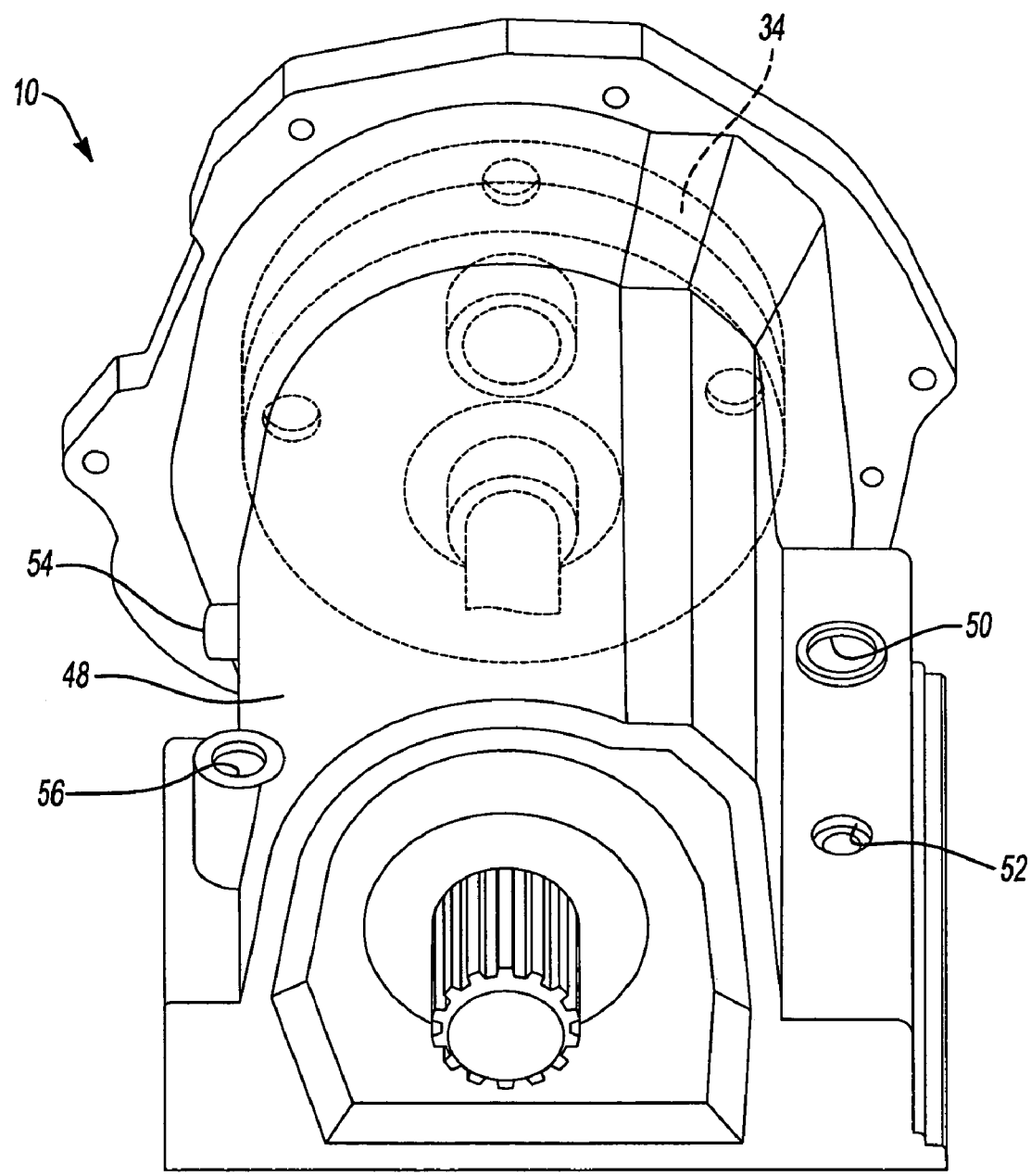
FIG. 3 is a perspective view of an exemplary automatic transmission.

With reference to FIG. 3, automatic transmission 10 includes a housing 48 having a dipstick aperture 50, a temperature compensation aperture 52, a cooler fitting aperture 54 and a shifter aperture 56.

To purge air trapped within cavities of torque converter 34 and transmission housing 48, drive unit 28 is operable to selectively engage torque converter 34 and rotate the torque converter during filling. During the filling operation, fill nozzle 20 enters dipstick aperture 50 and return nozzle 30 enters cooler fitting aperture 54 to define the path of fluid flow during the filling operation. Station and tank exit valves 58 and 59, respectively, are plumbed in line between return nozzle 30 and tank 36 to selectively restrict the flow through transmission 10.

Drive unit 28 includes a spindle 60 having a plurality of drive lugs 62 axially extending therefrom. A vacuum cup 64 is fixed to spindle 60. Vacuum cup 64 includes an outer lip 66 for selective engagement with torque converter 34. An aperture 68 extends through vacuum cup 64 and is in communication with a vacuum source (not shown). Spindle 60 is rotatably mounted to a support 70. Support 70, as well as spindle 60, are axially moveable along a slide 72 to provide a method for selectively engaging drive lugs 62 and vacuum cup 64 with torque converter 34.

Figure 4:
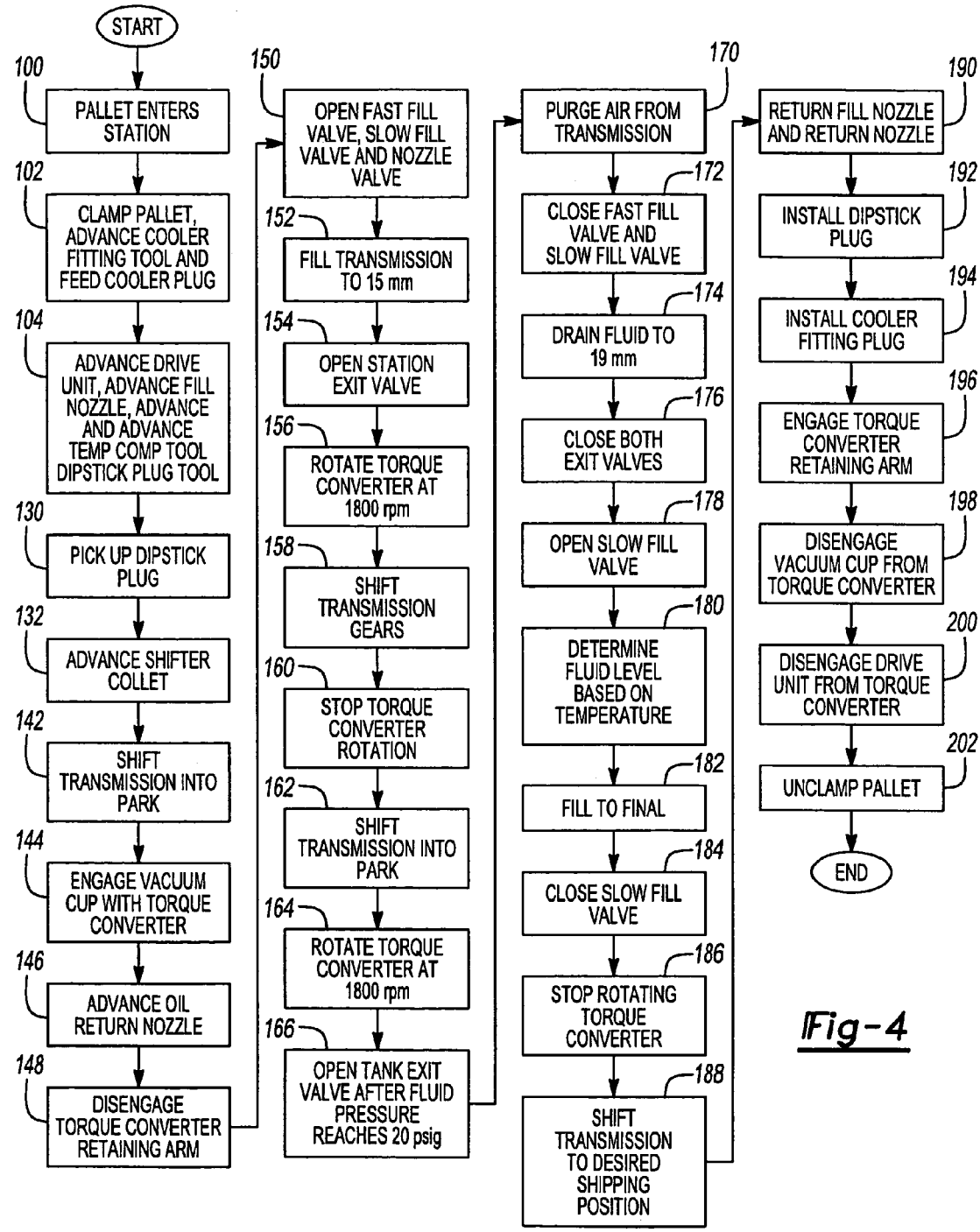
FIG. 4 is a flow chart depicting the process of filling an automatic transmission.

With reference to FIG. 4, a process of filling automatic transmission 10 will be described. It should be appreciated that prior to entering work station 14, transmission 10 is mounted to a pallet 74. Pallet 74 travels along conveyor 16 from station to station during the assembly process.

At step 100, pallet 74 enters work station 14. At step 102, pallet clamps 76 engage pallet 74 to fix the position of transmission 10 with oil fill machine 12. Additionally, cooler fitting tool 32 advances toward a bank of cooler fittings. One cooler fitting is fed toward and coupled to cooler fitting tool 32.

At step 104, drive unit 28 is advanced to engage drive lugs 62 with torque converter 34. Outer lip 66 of vacuum cup 64 also engages torque converter 34. Also, fill nozzle 20 is advanced to engage dipstick aperture 50.

Figure 5:
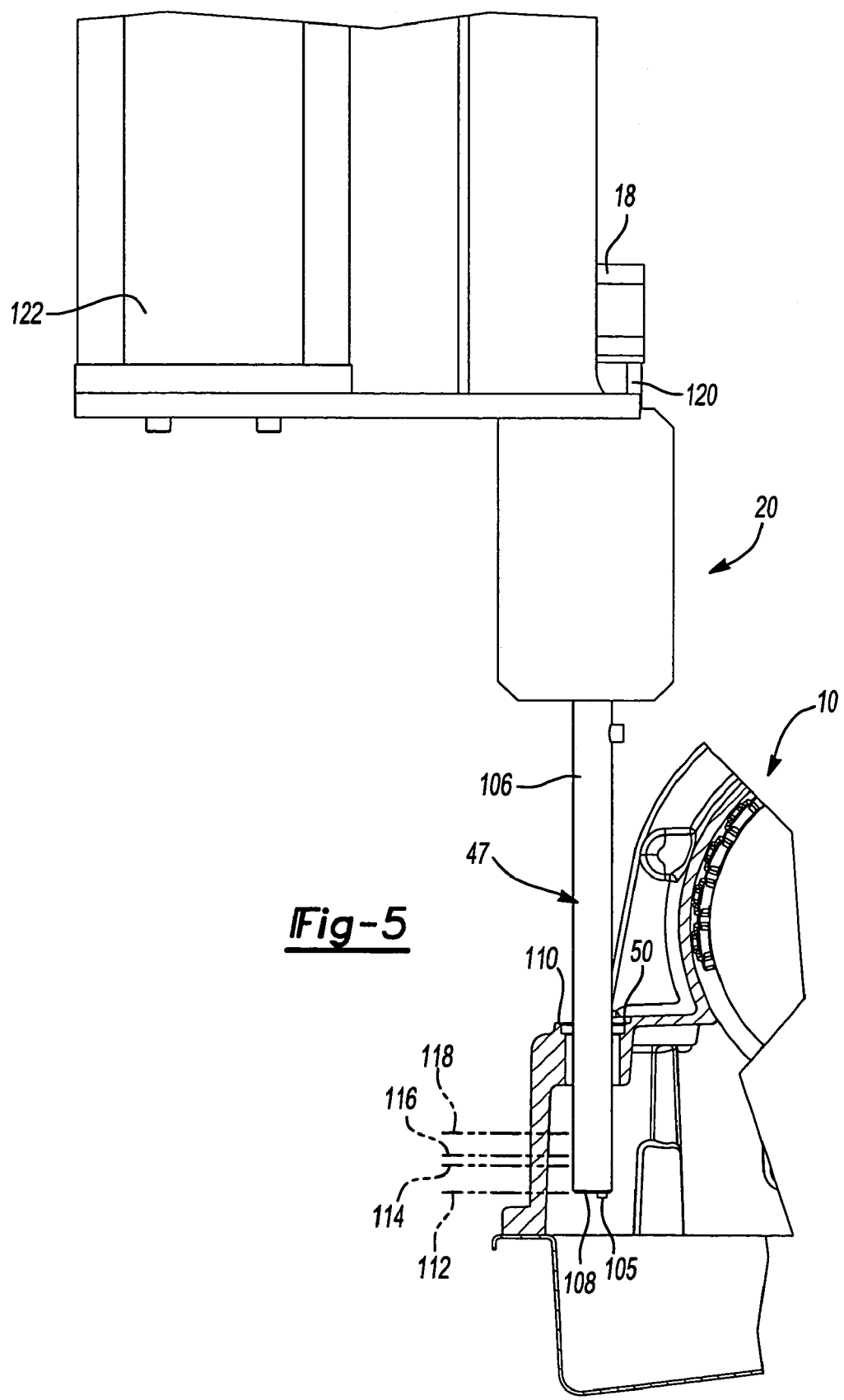
FIG. 5 is a fragmentary cross-sectional side view depicting a fill nozzle and an automatic transmission.

As shown in FIG. 5, fill nozzle 20 includes a supply tube 105 and a depth gage 106. Depth gage 106 includes a bubbler transducer which measures the pressure head generated at an end face 108 of depth gage 106. The bubbler transducer is calibrated to provide a signal equivalent to fluid depth in millimeters. To define a datum plane from which to measure fluid depth, end face 108 is inserted a predetermined distance from a land 110 of transmission housing 48. As such, end face 108 defines a plane 112 from which fluid depth measurements are taken. Line 114 represents 15 mm of fluid depth. Line 116 represents 19 mm of fluid depth and line 118 represents 30 mm of fluid depth above end face 108. Fast fill valve 42, slow fill valve 44, nozzle valve 47, station exit valve 58, tank exit valve 59 and depth gage 106 are in communication with a controller 121. Controller 121 actuates the fill valves and the exit valves based on feedback provided by depth gage 106 to maintain a desired fluid level.

Fill nozzle 20 and depth gage 106 are mounted on a slide 120. An actuator 122 is mounted to gantry frame 18 and is controllable to selectively raise and lower slide 120 and fill nozzle 20. One skilled in art will appreciate that actuator 122 may include any number of mechanical operators such as electric motors, hydraulic pistons, gear transfer mechanisms, chain drive mechanisms and the like. Actuator 122 may also be coupled to a positioning mechanism (not shown) to move actuator 122 within the space defined by gantry frame 18.

Figure 6:
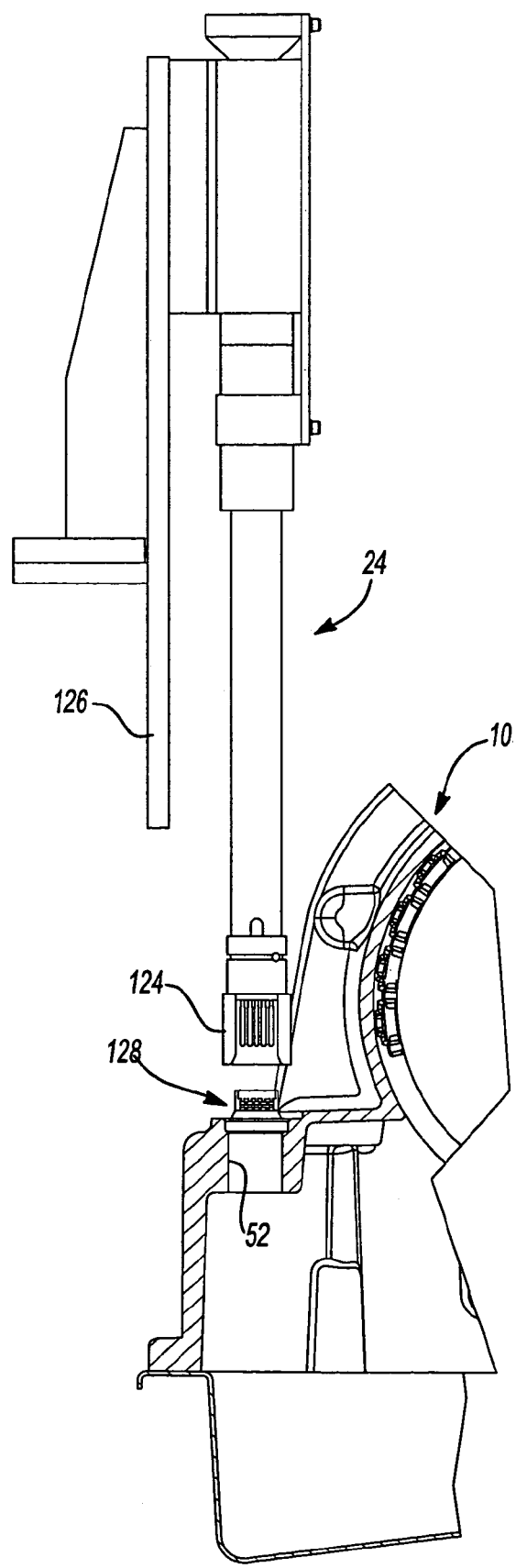
FIG. 6 is a fragmentary cross-sectional side view depicting a temperature compensation tool in conjunction with an automatic transmission.

Step 104 also includes advancing temperature compensation tool 24 as shown in FIG. 6. Temperature compensation tool 24 includes a 12-pin receptacle 124 coupled to a slide 126 operable to raise and lower 12-pin receptacle 124 in to and out of communication with a 12-pin connector 128.

12-pin connector 128 was mounted within transmission 10 prior to the transmission's arrival within work station 14. 12-pin connector 128 is in communication with a thermocouple mounted within transmission housing 48. Accordingly, temperature compensation tool 24 operates to communicate a signal indicative of the fluid temperature to controller 121 to provide the controller with fluid temperature data during the filling operation. Because the density of the fluid used in the automatic transmission changes with temperature, monitoring of the fluid temperature during filling improves fill accuracy. Controller 121 adjusts the final fill height to account for the volumetric change due to changes in temperature.

Figure 7:
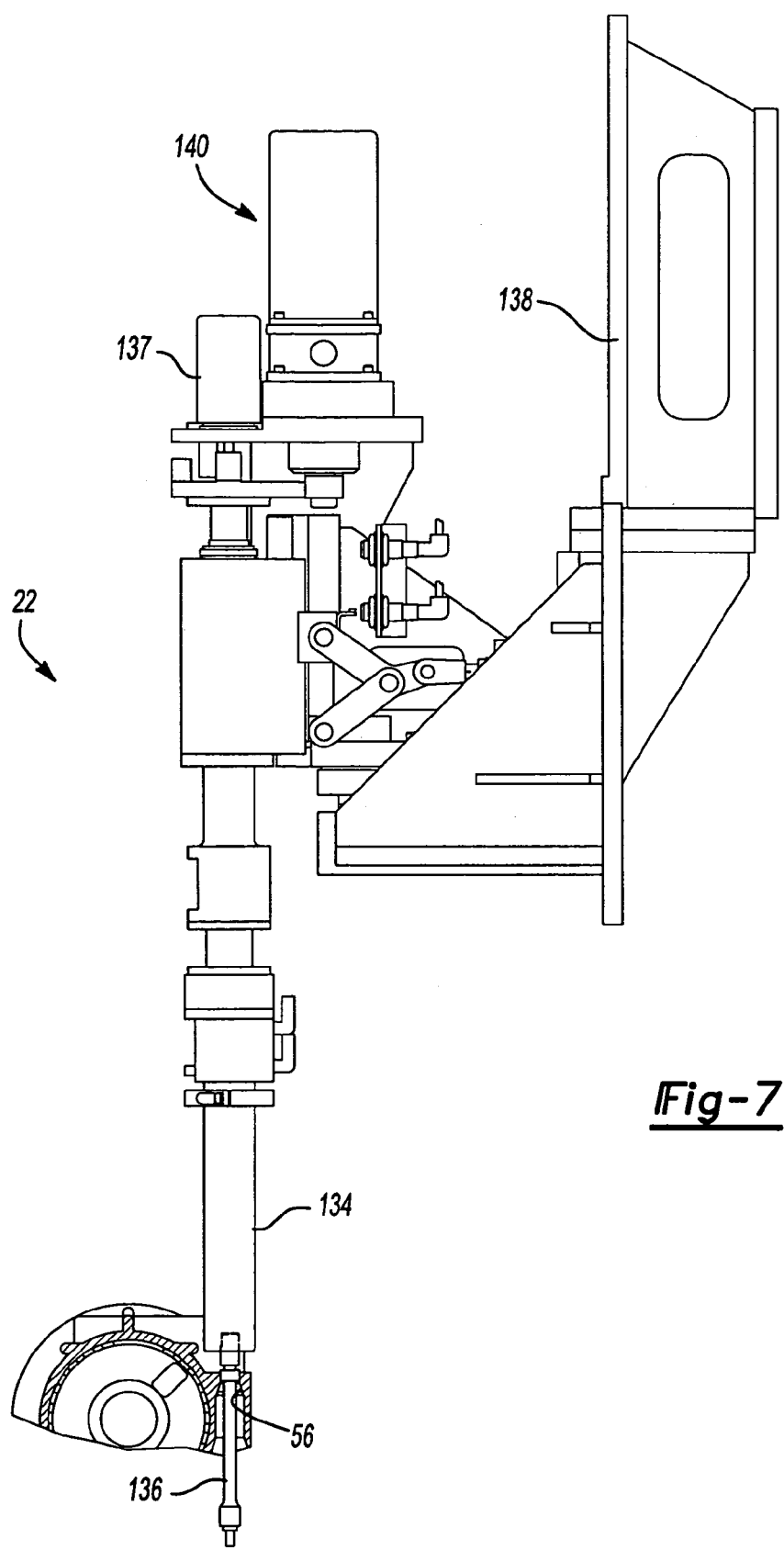
FIG. 7 is a fragmentary cross-sectional side view depicting a shifter collet in conjunction with an automatic transmission.

At step 130, dipstick plug tool 26, which was advanced at step 104, picks up a dipstick plug. At step 132, shifter collet 22 is advanced as shown in FIG. 7. Shifter collet 22 includes a sleeve 134 which is selectively engageable with a shifter shaft 136. Rotation of shifter shaft 136 causes transmission 10 to shift through the available gear ratios. An encoder 137 communicates the rotational position of sleeve 134 to controller 121. Shifter collet 22 includes a slide 138 coupled to gantry frame 18 for raising and lowering shifter collet 22 in to and out of engagement with shifter shaft 136. Shifter collet 22 also includes an actuator 140 for incrementally rotating shifter shaft 136. It is contemplated that shifter collet 22 may be moved from side to side within gantry frame 18 as well as in a vertical manner as previously described. At step 142 transmission 10 is shifted into park.

Figure 8:
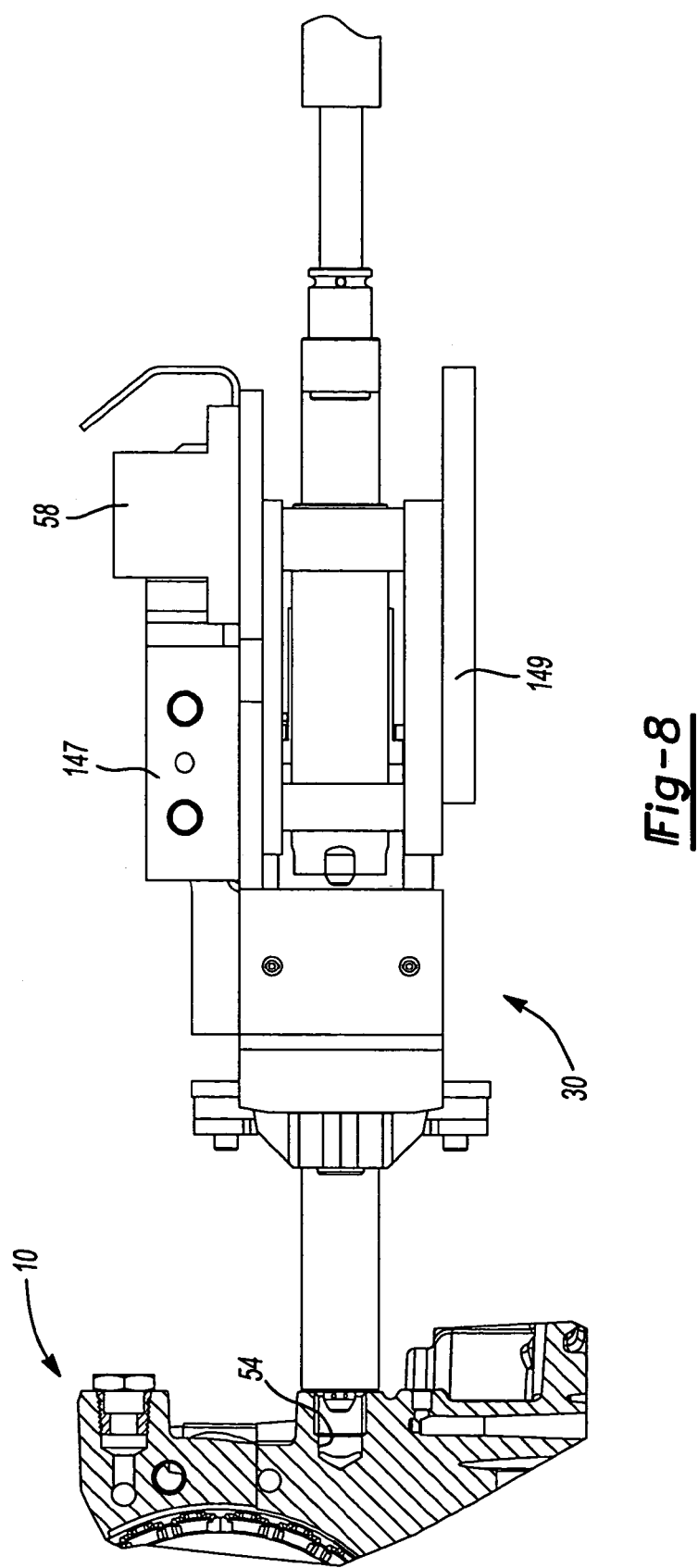
FIG. 8 is a cross-sectional side view depicting a return nozzle in conjunction with an automatic transmission.

At step 144, vacuum is supplied through aperture 68 to axially displace torque converter 34 toward drive unit 28. This operation properly positions torque converter 34 relative to the internal fluid passageways within automatic transmission 10. At step 146, return nozzle 30 is advanced into engagement with cooler fitting aperture 54 as shown in FIG. 8. At this time, a complete fluid circuit from tank 36 through fill nozzle 20, automatic transmission 10, return nozzle 30 and back to tank 36 is defined. Return nozzle 30 includes station exit valve 58 and a pressure transducer 147. Pressure transducer 147 provides a signal indicative of the fluid pressure exiting the transmission through return nozzle 30. Return nozzle 30 is mounted to a slide 149 which allows the return nozzle to move between the advanced position engaged with cooler fitting aperture 54 and a retracted position disengaged from the transmission.

At step 148, a retaining arm restricting rotation of torque converter 34 is disengaged to allow the torque converter to rotate. At step 150, nozzle valve 47, fast fill valve 42 and slow fill valve 44 are opened. Step 152 defines filling the transmission to a depth of 15 mm represented by line 114 in FIG. 5. Once the 15 mm depth has been met, station exit valve 58 is opened at step 154 to allow fluid to flow through transmission 10. Tank exit valve 59 remains closed to create a back pressure within transmission 10. Fast fill valve 42, slow fill valve 44 and nozzle valve 47 are controlled to assure that a depth of at least 15 mm is maintained throughout the remaining steps.

At step 156, drive unit 28 causes torque converter 34 to begin to rotate. Drive unit 28 maintains the torque converter speed at a predetermined value such as 1800 rpm. The 15 mm depth corresponds to a minimum sump level which is maintained to assure that additional air is not pumped into the system.

At step 158, shifter collet 22 rotates shifter shaft 136 to cause the transmission to shift gears. Preferably, the transmission will be operated for two seconds in each of the available gears including park, reverse, neutral, drive and any ancillary gear settings. By sweeping through the gears, each of the hydraulic servos associated with the internal clutches of the transmission are actuated to fill their respective servo chambers.

Torque converter rotation is stopped at step 160. The torque converter is stopped to allow the transmission to be shifted into park at step 162.

After the transmission has been shifted into park, drive unit 28 rotates torque converter 34 at 1800 rpm as depicted in step 164. Pressure transducer 147 provides a signal indicative of the fluid pressure exiting the transmission. Once pressure transducer 147 indicates that a pressure of 20 psig has been reached, tank exit valve 59 is opened at step 166. Next, the transmission is purged of air as depicted at step 170. During the purging cycle, station and tank exit valves 58 and 59 as well as fast fill valve 42, slow fill valve 44 and nozzle valve 47 are controlled to maintain a fluid depth of 30 mm.

After the air has been purged from the transmission, fast fill valve 42 and slow fill valve 44 are closed at step 172. At step 174, fluid is allowed to drain into tank 36. Once the fluid level has been below the 19 mm line for one second, station and tank exit valves 58 and 59 are closed at step 176.

At step 178, slow fill valve 44 is opened to begin the final filling portion of the process. Line 116 is offset a distance of 19 mm from end face 108 of depth gage 106. The 19 mm line represents a nominal target fill level. This target fill level incorporates an excess volume of fluid which will fill the lines interconnecting transmission 10 and the transmission fluid cooler mounted on the vehicle. Furthermore, the 19 mm line is a nominal target that controller 121 uses as a starting point to determine the final fill depth. Based on the temperature/viscosity curve of the fluid and the fluid temperature as relayed by temperature compensation tool 24, an adjusted final fill depth is calculated at step 180.

At step 182, fluid is allowed to pass through slow fill valve 44 and orifice 46 until the adjusted fill level is met. At step 184, slow fill valve 44 is closed. At step 186, drive unit 28 is instructed to stop rotating torque converter 34. Once torque converter 34 has stopped rotating, shifter collet 22 shifts the transmission into the vehicle assembler's desired gear position at step 188. For example, some manufacturers wish to have the transmission placed in neutral while others desire to have the transmission placed in park prior to assembly within the vehicle.

At step 190, fill nozzle 20 and return nozzle 30 are retracted away from the transmission. At step 192, dipstick plug tool 26 advances and inserts the dipstick plug. At step 194, cooler fitting tool 32 advances and installs a cooler fitting plug. After the plugs have been installed, dipstick plug tool 26 and cooler fitting tool 32 retract away from transmission 10.

At step 196, the retaining arm which was previously disengaged from the torque converter is now allowed to engage the torque converter. At step 198, vacuum is no longer supplied through aperture 68 and lip 66 is disengaged from torque converter 34. At step 200, support 70 and spindle 60 are retracted along slide 72 to disengage lugs 62 from torque converter 34. Pallet clamps 76 disengage pallet 74 at step 202. Pallet 74 and automatic transmission 10 exit oil fill machine 12 and work station 14.

Furthermore, the foregoing discussion disclosed and describes merely exemplary embodiments of the present invention. For example, the temperature compensation tool and the fill nozzle may be mounted on a singular slide and moved by a single actuator. Additionally, the amount of fluid present within the automatic transmission may be determined by any number of devices including sight gages, dipsticks, capillary tubes and the like, without departing from the scope of the present invention. Also, one skilled in the art will readily recognize from such discussion, and from the accompanying drawings and claims, that various changes, modifications and variations may be made therein without department from the spirit and scope of the invention as defined in the following claims.

What is claimed is:

1. A fluid fill machine for an automatic transmission having a torque converter, a first port and a second port, the fill machine comprising:
   a pressurized fluid source;
   an inlet nozzle in communication with said fluid source and adapted to be coupled to the first port;
   an outlet nozzle adapted to be coupled to the second port;
   a drive motor adapted to selectively engage and rotate the torque converter;
   a fluid depth gauge that generates a fluid depth signal; and
   a controller that controls said drive motor to rotate the torque converter to purge the transmission of air, said controller operable to vary the flow of fluid through said inlet and outlet nozzles to fill the transmission to a desired fluid depth based on said fluid depth signal.

2. The fill machine of claim 1 further including a motor, a pump and a tank, said motor drivingly coupled to said pump, said pump supplying fluid to said inlet nozzle.

3. The fill machine of claim 2 further including a gantry frame supporting said inlet nozzle.

4. The fill machine of claim 3 further including an actuator coupled to said inlet nozzle, said actuator being adapted to move said inlet nozzle into contact with said transmission.

5. The fill machine of claim 1 wherein said depth gauge includes a pressure transducer to determine a depth of fluid.

6. The fill machine of claim 1 further including a torque converter positioning device.

7. The fill machine of claim 6 wherein said torque converter positioning device includes a vacuum cup adapted to axially position the torque converter relative to a transmission housing.

8. The fill machine of claim 1 further including a shifting tool adapted to engage the transmission and vary the gear ratio produced by the transmission.

9. The fill machine of claim 8 wherein said shifting tool includes a spindle coupled to an actuator for rotating said spindle.

10. The fill machine of claim 1 further including a cooler plug slide adapted to install a cooler plug on the transmission.

11. The fill machine of claim 1 further including a first valve and a second valve plumbed in parallel paths interconnecting said fluid source and said inlet nozzle, said first valve operable to selectively supply fluid at a predetermined flow rate to said inlet nozzle, said second valve operable to selectively supply fluid at a reduced flow rate to said inlet nozzle.

12. A method for filling an automatic transmission with fluid, the transmission having a first fluid port, a second fluid port and a torque converter, the method comprising the steps of:
   pumping fluid through the transmission entering at the first port and exiting through the second port;
   rotating the torque converter to purge trapped air;
   shifting the transmission;
   filling the transmission to a desired level;
   plugging the first and second ports; and pumping the fluid into the transmission until a predetermined level is reached prior to rotating the torque converter.

13. The method of claim 12 further including maintaining at least said predetermined fluid level during the rotating step.

14. The method of claim 13 wherein shifting the transmission includes operating the transmission in each of the transmission drive ratios.

15. The method of claim 14 further including filling the transmission at a first rate until a predetermined level is reached, allowing some fluid to drain out of the transmission and filling the transmission at a second rate slower than said first rate after some of the fluid is allowed to drain.

16. The method of claim 12 further including stopping the torque converter and shifting the transmission into park.

17. The method of claim 16 further including restricting flow through said second port to limit the exit of the fluid.

18. The method of claim 17 further including rotating the torque converter and opening the second port to allow the fluid to exit from the transmission after a predetermined fluid pressure is met.

19. The method of claim 12 further including overfilling the transmission, purging air out of the transmission during the overfilled condition and draining excess fluid out of the transmission.

20. The method of claim 19 wherein the step of draining excess fluid includes reducing flow through the first port to lower the fluid level below a desired fill level and subsequently opening the first port to fill the transmission to the desired fill level.

21. The method of claim 12 further including determining the temperature of the fluid and adjusting said desired level to account for fluid changes based on the temperature of the fluid.

22. The method of claim 12 further including engaging a tool with the transmission to allow control of the transmission gearing.

23. The method of claim 12 further including positioning the torque converter at a desired axial location.

24. The method of claim 23 wherein the step of positioning the torque converter includes applying a vacuum to the torque converter.

25. The method of claim 12 wherein the rate of fluid entering the transmission is greater than the rate of fluid exiting the transmission.

26. A method for filling an automatic transmission with fluid, the transmission having a housing and a torque converter rotatably mounted in the housing, the transmission operable to provide multiple drive ratios, the method comprising:
   filling the housing with fluid to a predetermined level;
   rotating the torque converter;
   shifting the transmission to produce a different drive ratio;
   stopping the torque converter;
   shifting the transmission into park;
   rotating the torque converter;
   pumping fluid through the housing once a predetermined fluid pressure is met;
   overfilling the transmission with fluid;
   purging air from the transmission;
   draining the housing to a level below a desired final fill level; and
   filling the housing to said desired fill level.

27. The method of claim 26 further including substantially continuously monitoring a fluid level in the transmission, providing a signal indicative of said fluid level to a controller, said controller varying fluid flow through the housing to maintain desired fluid levels.

28. The method of claim 27 further including mounting the transmission to a pallet and temporarily positioning said pallet within a work station having a conveyor extending therethrough.

* * * * *